United States Patent Office 3,390,959
Patented July 2, 1968

3,390,959
PROCESS OF MAKING ALUMINA
Frederick J. Sibert, Chicago, Ill., assignor to Nalco Chemical Company, Chicago, Ill., a corporation of Delaware
No Drawing. Filed Apr. 30, 1965, Ser. No. 452,373
5 Claims. (Cl. 23—143)

ABSTRACT OF THE DISCLOSURE

This invention relates to the use of acrylic acid-acrylate homopolymers and copolymers of acrylic acid and acrylates which contain not more than 20% of other ethylinically unsaturated polymerizable polar monomers for treating Bayer process alumina to more effectively improve the removal of red mud therefrom.

---

The present invention is concerned with an improved method of alumina manufacture. More specifically, the instant invention relates to an improvement in making alumina via the Bayer process.

The almost universally used process for the manufacture of alumina is the Bayer process. In its broadest aspects, this method is carried out almost exclusively in aqueous solution, and is achieved by reaction of bauxite and a strong base such as caustic soda or lime in steam-heated autoclaves whereby the alumina is transformed into a soluble aluminate form. In this step, a considerable amount of insoluble impurities result or are released from the bauxite, which recrement must be separated from the desired alumina constituent. These residues commonly known as red muds include iron oxides, sodium aluminosilicate, titanium oxide and other materials. Generally these muds appear as very fine particles which are difficult to separate out. Yet the red muds which usually constitute about 5–30% by weight of the ore must be rapidly and cleanly separated from the solubilized alumina liquor in order to make this particular step economically efficient. If the rate of separation is too slow, output is materially diminished and overall process efficiency impaired. Likewise, if the separation is not clean, the resultant alumina in the form of aluminate is somewhat crude and undesirable for a number of end-uses. The insoluble impurities present in the alumina as carry-through from the manufacturing process tend to add extraneous non-active matter into the specific media, such as water, being treated with aluminate for a variety of purposes. For example, low grade sodium aluminate containing relatively large amounts of mud impurities when used to treat water results in a situation of increased tendency to form slime masses as the direct result of the insoluble impurities present, which masses tend to foul feeding equipment. Also, if the crude sodium aluminate contains substantial amounts of impurities as an admixture, solution problems are quite difficult to overcome if the aluminate is fed in the form of a solid.

In order to overcome the above problems, and materially speed up the separation of red muds from alumina as well as effect a cleaner separation of the constituents, the industry commonly adds starch or starch derivatives at this point in the process. While these materials do aid somewhat in increasing the efficiency of the settling step, the starch additives possess a number of drawbacks. Most important is the fact that relatively large amounts of starch must be employed to obtain satisfactory separation. Yet, required handling of such large quantities of starch is objectionable. Also, use of excessive amounts of starch necessarily results in attendant high organic loading of the clarified liquor with the starch or starch decomposition products. Since the starch is generally added to a hot digested bauxite to effect separation of impurities and solubilized alumina, the starch additive frequently breaks down into smaller units such as oxalates. These materials are carried through with the alumina liquor and cause problems in further processing of the alumina such as precipitation and scaling of the oxalates upon heat transfer surfaces. It would, therefore, be of benefit to the alumina manufacturing art to increase the speed and efficiency of separation of red mud impurities from the desired aluminate liquor constituent resulting from the digesting procedures. Particularly, if a chemical substitute for starch could be found, which substitute would be effective at much smaller dosages, such chemical class would find ready acceptance by the alumina-producing industry.

It, therefore, becomes an object of the invention to provide an improved method of producing alumina.

A specific object of the invention is to effect an efficient separation of solubilized alumina from red mud impurities resulting from prior digestion of bauxite ore in the Bayer process by addition of specific chemical agents at exceptionally low dosages.

Other objects will appear hereinafter.

In accordance with the invention, an improvement has been discovered in the Bayer process of preparing alumina from bauxite. The Bayer process broadly includes the steps of digesting bauxite in aqueous solution and at elevated temperatures, usually under steam pressure with a strongly basic substance to solubilize the alumina contained in the ore. The alumina liquor is then separated from the water insoluble impurities of the bauxite ore which are the water insoluble residues that remain after reaction between the bauxite ore and basic material used to digest the ore. The impurities include materials originally present in the ore as well as insoluble reaction products from the digestion step. The aluminate liquor is then filtered and alumina in relatively pure form precipitated from the filtrate as a trihydrate solid. The remaining liquid phase or spent liquor is returned to the initial digestion step and employed as a digestant of additional ore after being reconstituted with additional base. Generally, liquor entrapped with the red muds is lixiviated therefrom with water and the resultant liquor also reused.

The above-discussed impurities, generically referred to as red muds, should be separated from the aluminate liquor at a relatively fast rate to make the overall Bayer process efficient. Also, the separation itself should be clean and complete with but minimal amounts of red mud residue remaining as a dispersed phase in the solubilized alumina liquor.

In the above-discussed process, the improvement forming the basis of the invention lies in addition to the digested bauxite containing solubilized alumina and impurities of certain organic polymeric substances. The polymer treatment substantially enhances the rate of separation of dispersed red muds from solubilized alumina or aluminate salt.

The invention is quite specific with respect to the type of polymer necessary to effect the improved separation rate. It has been determined that the type of ameliorating additive polymer should contain at least 80% or re-occurring moieties selected from either acrylic acid or salts of acrylic acid. Thus, the separation aid may either be a homopolymer comprising polyacrylic acid or salts of polyacrylic acid, or a copolymer, or terpolymer or higher multi-component polymer wherein at least 80% of the polymer structure is made up of acrylic acid or acrylic acid salt groups. The polyacrylate salt may be either an alkali metal, alkaline earth metal or ammonium salt.

Besides the homopolymers of polyacrylic acid or polyacrylate salts, another preferred species is a water-soluble copolymer derived from copolymerization of a monomer mixture containing 80-99% by weight of acrylic acid or acrylate salt, and most preferably, alkali metal acrylate salt and 1-20% by weight of an additional and different monomer comprising an ethylenically unsaturated polymerizable compound containing a hydrophilic group in a side chain attached to the unsaturated hydrocarbon structure.

Particularly useful homopolymers or copolymers of the type described above should have a molecular weight in excess of 50,000, and more preferably in excess of 100,000. Excellent additive polymers have molecular weights even as high as ten million.

A wide variety of one or more different monomers may be copolymerized or terpolymerized in amounts up to about 20% with acrylic acid or salts thereof. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropenyl acetate, itaconic acid, vinyl acetate, alpha-methyl styrene, styrene, fumaric acid, aconitic acid, citraconic acid, amides of any of the foregoing acids, alkali metal derivatives (e.g., sodium, potassium and lithium), alkaline earth metal derivatives (e.g., magnesium, calcium, barium and strontium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene, etc. Of the just-mentioned comonomers, greatly preferred materials among these contain a hydrophilic group in a side chain off the ethylenically unsaturated hydrocarbon group. Those monomers which do not contain such hydrophilic solubilizing group should be used in lesser amounts of say about 1-5% by weight based on total weight of monomer present.

Still other monomeric substances which may be employed in conjunction with the acrylic acid or acrylic acid salt constituent include materials such as sulfoethyl acrylater, carboxylethyl acrylate, diethyl vinyl phosphonate, crotonic acid or salts thereof, vinyl sulfonate or salts thereof, vinyl alcohol and vinyl aryl hydrocarbons containing solubilizing groups such as sulfonates, etc.

The homopolymers or multi-component polymers of the invention are utilized by simply adding these adminicles to the digested bauxite ore containing solubilized alumina and red mud residues dispersed throughout the aluminate liquor, in an amount at least sufficient to accelerate the separation of the red mud dispersed solids from the liquid phase. Generally, for best results, at least about 0.001 lb. of chemical per ton of mud residue or insolubles should be employed. More preferably, at least 0.01 lb. of chemical per ton is added to the digester effluent to effect rapid separation. Most preferably, 0.05 to about 10 lbs. of chemical per ton are added. It is understood, that higher amounts than the just-stated maximum may be employed without departing from the scope of the invention, although generally a point is reached in which additional amounts of chemical do not improve the separation rate over already achieved maximum rates. Thus, it is uneconomical to use excessive amounts of material when this point is reached.

In order to determine the efficiency of the homopolymers of polyacrylic acid and salts thereof, and copolymers of these materials in materially enhancing rate of separation of red mud insolubles from aluminate liquor, the following test procedure was devised. This test method was devised to meet typical industrial conditions, particularly with regard to the step wherein digested effluent is treated with chemical to facilitate separation out of insolubles. In order to prepare test media, a digested ore was prepared as follows. A slurry was made of 593 grams ore, 15 grams of calcium hydroxide and 4750 ml. of an industrial spent liquor. The spent liquor was an aqueous solution of soda ash, caustic, aluminate and sodium silicate. The above materials were added to a steam autoclave equipped with a turbine blade stirrer (800-1000 r.p.m.). Air was displaced in the autoclave by pressuring three times to 200 p.s.i. alternately with nitrogen followed by venting. The contents of the autoclave were heated to 200° C. after a warm-up time of ½ hour. An equilibrium vapor pressure of 160-200 p.s.i. was then obtained. The digestion temperature was held for ½ hour, the contents were flashed to atmosphere and the resultant digester effluent diluted with boiling water to a total volume of 6 liters. This material employed as test media was then stored with stirring at 210° F.

The separation tests were carried out in the following manner. A 500 ml. Pyrex graduate, with tapered top to accommodate a stopper, was marked at one-inch intervals. The graduate was preheated to 200° F. to 10 to 20 ml. of dissolved polymer treatment at any desired dosage level was added to the graduate, containing 500 ml. of the digestion effluent. The graduate was stoppered and inverted to mix the contents. It was then set in an oven, with a glass door, and maintained at 200° F. A stirrer rotating at 1 r.p.m. was inserted and the separation rate followed by visual measurement. Specifically, this measurement was made by following the solid-liquid interface and measuring the drop of this interface in inches per minute. This figure was then converted to a separation rate of red mud insolubles from clear liquor in terms of feet per hour. Table I below shows a comparison of results obtained between starch and sodium polyacrylate with respect to performance in the above-described test. This particular homopolymer, the homopolymer of acrylic acid, and various copolymers of either of these two substances show as high as 20-40 times greater efficiency than starch on an equal dosage basis.

TABLE I

| Chemical | Dosage, lbs. Chemical/ton red mud | Separation Rate, feet/hour |
| --- | --- | --- |
| Starch | 1.7 | 2 |
| Do | 5.1 | 4 |
| Do | 10.2 | 8 |
| Do | 20.4 | 10 |
| Sodium polyacrylate | 0.21 | 5 |
| Do | 0.3 | 12 |
| Do | 0.6 | 20 |
| Do | 1.2 | 40 |
| Do | 3.0 | 60 |

A number of copolymers of acrylic acid or acrylic salts containing a variety of other comonomers were synthesized, and tested for their activity in promoting separation between the red mud insolubles and clear aluminate liquor. In this comparison, another homopolymer of sodium acrylate was prepared which had a substantially higher molecular weight than the above-tested material, and consequently gave even more startling results in terms of promoting separation of red mud from aluminate liquor. In all instances, the homopolymer of sodium acrylate and various copolymers of sodium acrylate were tested at a dosage level of 0.3 lb. of chemical per ton of red mud. At this level the high molecular weight sodium polyacrylate gave a separation rate of 40 ft./hour. Results with respect to the various copolymers of sodium acrylate are given in Table II below.

TABLE II

| Comonomer | Percent Comonomer | Separation Rate, feet/hr. |
| --- | --- | --- |
| Acrylamide | 2 | 30 |
| Do | 5 | 36 |
| Do | 10 | 4.8 |
| Do | 20 | 1.8 |
| Fumaric-sodium salt | 1 | 24 |
| Do | 2 | 60 |
| Do | 5 | 24 |
| Do | 15 | 3.6 |
| Diethyl vinyl phosphonate | 2 | 24 |
| Do | 5 | 6 |
| Crotonic acid sodium salt | 20 | 3.6 |
| Do | 2 | 3.6 |
| Methylacrylic acid-sodium salt | 5 | 1.0 |
| Vinyl sulfonate-potassium salt | 2 | 6 |
| Do | 5 | 3 |

It was surprising to note that a wide variety of polymers other than the above-described materials, both addition-type and condensation polymers and interpolymers had little or no activity in enhancing separation rate of red mud residue from aluminate liquor. The following substances had no greater activity than a blank run involving no chemical addition, and in some instances the added polymer actually decreased the rate of separation of red mud impurities compared to blank runs. Blank runs involving no benefit of addition of the chemicals of the invention generally had a separation rate of less than 0.1 ft./hr. The following polymers exhibited about the same separation rate or even slowed down inherent separation of dispersed water-insoluble red mud impurities from liquid phase. A few of the unsuccessful polymers tested include polyvinyl alcohol, polyethylene oxide, polyacrylamide, polyvinyl pyrrolidone, polystyrene trimethyl ammonium hydroxide, polydimethyl aminoethyl methacrylate, copolymer of diallylamine and acrylamide, polyethylene imine, polyvinyl-toluene sulfonate, copolymer of polyvinyl pyrrolidone and vinyl alcohol, the bisulfate adduct of polyacroelin, copolymer of dimethylaminoethyl methacrylate and acrylamide, polyamines of varying polymer weights, polyquaternaries of various molecular weights, copolymer of 5% sodium acrylate and 95% acrylamide, 50–50 copolymer of sodium acrylate and acrylamide, and copolymer of vinyl methyl ether and maleic anhydride, and others.

It is understood, of course, that mixtures of different homopolymers, and copolymers, of the invention as defined above, may be employed with equal success. Likewise, other materials may be added along with the successful polymers. These auxiliary chemicals may be added as dispersing aids, extenders, anti-foamers, etc. It is preferred that the polymers and interpolymers of the invention be added in form of aqueous solutions in order to insure ready dissolution of the additive into the digester ore slurries.

By the term "polymer" as used herein is meant to include homopolymers, copolymers and interpolymers of acrylic acid or acrylate salts according to the previously defined limits of the invention.

The invention is claimed as follows:

1. In the Bayer process of preparing alumina from bauxite which comprises the steps of digesting said bauxite in aqueous solution and at elevated temperatures with a strong base to solubilize said alumina, and separating said alumina from the water insoluble impurities of said bauxite, said impurities consisting of water insoluble residues remaining after the reaction between said bauxite and said base, which residues are commonly called red mud; the improvement which comprises effecting the separation of said red mud from said alumina at an increased rate and with increased efficiency by addition to the digested bauxite containing said alumina and said impurities from between 0.001 to 10 pounds per ton of red mud of a polymer having a molecular weight of at least 50,000 and containing at least 80% of reoccurring moieties selected from the group consisting of acrylic acid and salts thereof.

2. The process of claim 1 wherein said polymer is a homopolymer selected from the group consisting of polyacrylic acid and salts thereof.

3. The process of claim 1 wherein said polymer is a water soluble copolymer derived from copolymerizing 80–99% by weight of an alkali metal acrylate and 1–20% by weight of an additional and different monomer comprising an ethylenically unsaturated polymerizable compound containing a hydrophilic group is a side chain.

4. The process of claim 1 wherein said polymer has a molecular weight of at least 100,000 and is added to the digested bauxite to provide a dosage ranging from between 0.05 to 10 pounds per ton of red mud.

5. The process of claim 3 wherein said copolymer is derived from copolymerization of sodium acrylate and acrylamide.

References Cited

UNITED STATES PATENTS

| | | | |
|---|---|---|---|
| 3,023,162 | 2/1962 | Fordyce et al. | 210—54 |
| 3,085,853 | 4/1963 | Lesinski et al. | 23—52 |
| 3,127,239 | 3/1964 | Cook | 23—143 |
| 3,142,637 | 7/1964 | Cook | 23—143 X |
| 3,194,757 | 7/1965 | Sullivan | 23—52 X |
| 3,276,998 | 10/1966 | Green | 210—54 X |

FOREIGN PATENTS

| | | |
|---|---|---|
| 200,682 | 1/1956 | Australia. |
| 235,979 | 9/1961 | Australia. |

OSCAR R. VERTZ, *Primary Examiner.*

HERBERT T. CARTER, *Examiner.*

UNITED STATES PATENT OFFICE
CERTIFICATE OF CORRECTION

Patent No. 3,390,959                 July 2, 1968

Frederick J. Sibert

It is certified that error appears in the above identified patent and that said Letters Patent are hereby corrected as shown below:

Column 3, line 39, "later" should read -- late --. Column 4, line 15, before "10" cancel "to". Column 6, line 23, "is" should read -- in --.

Signed and sealed this 2nd day of December 1969.

(SEAL)
Attest:

Edward M. Fletcher, Jr.
Attesting Officer

WILLIAM E. SCHUYLER, JR.
Commissioner of Patents